Figures 1, 2:
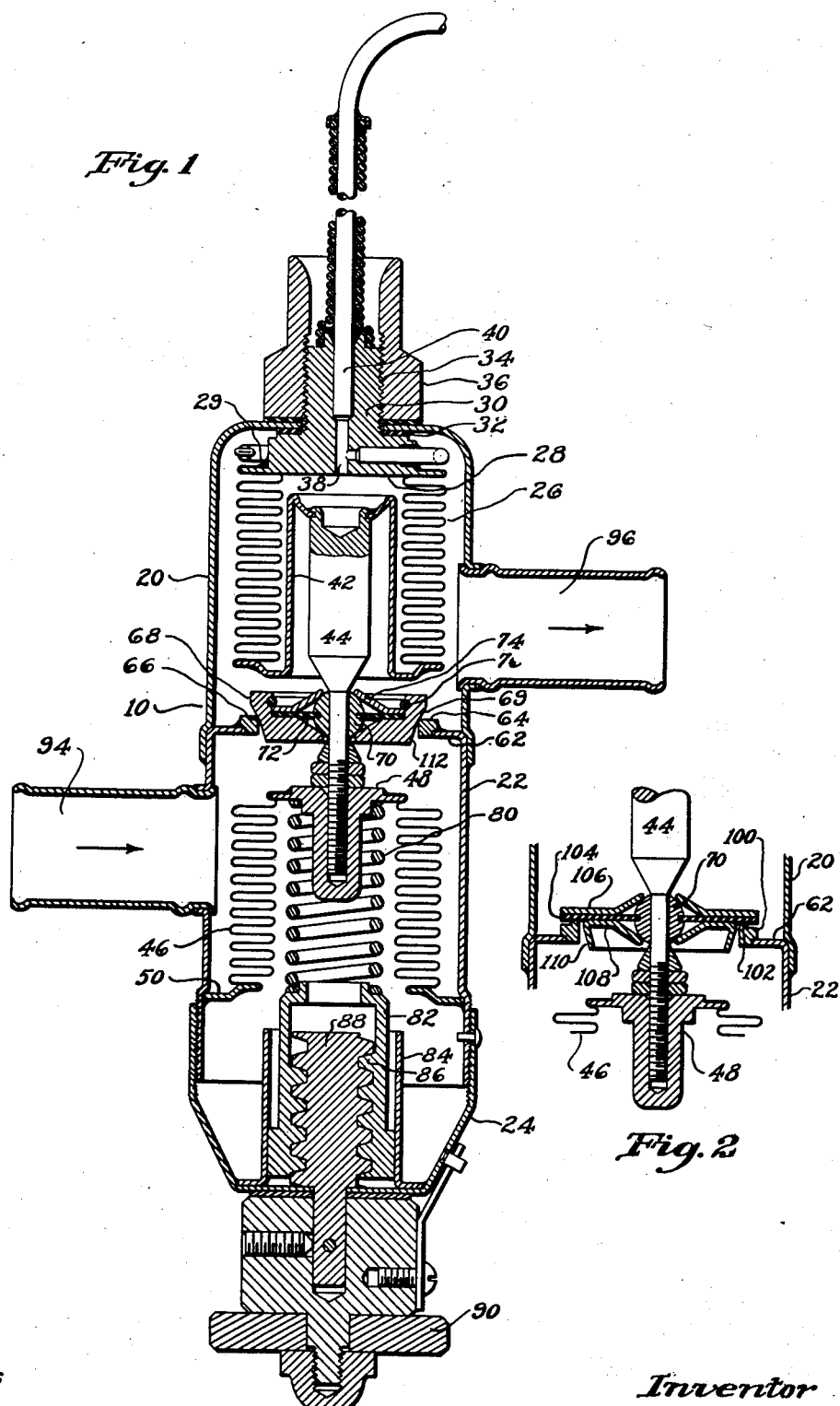

Jan. 19, 1943.  W. B. CLIFFORD  2,308,861
TEMPERATURE CONTROLLED VALVE
Filed Feb. 6, 1940

Witness
Paul F. Bryant

Inventor
Walter B. Clifford
by his attorneys
Fish Hildreth Cary & Jurney

Patented Jan. 19, 1943

2,308,861

UNITED STATES PATENT OFFICE 2,308,861

TEMPERATURE CONTROLLED VALVE

Walter B. Clifford, Boston, Mass., assignor to Clifford Manufacturing Co., Boston, Mass., a corporation of Delaware Application February 6, 1940, Serial No. 317,543

1 Claim. (Cl. 251—46)

The present invention relates to temperature controlled valves, and more particularly to valves of this type which are designed for actuation through small differences in operating pressures. Such valves are commonly used to control circulation of a heating or cooling medium within a region which is to be maintained within a predetermined temperature range. Such valves are commonly controlled from a point sufficiently remote to be influenced only by the temperature within the chamber to be controlled.

The particular embodiment with which the invention is concerned represents a valve of this type designed for controlling the flow of hot water or the like to maintain a predetermined temperature range within a vehicle body, the operation of the valve being controlled from a remote point under the influence of the temperature within the body. The valve must be compact in form with a rugged structure and capable of a complete shut-off of circulation when not in use. The valve must be also capable of modulating, that is, varying the flow of heating water therethrough as temperature conditions demand, rather than operating on a full open or closed position in which the hot water is either circulating freely or is completely shut off.

I have developed a valve which accurately controls the temperature within the vehicle body independently of external influences such, for example, as variation of pressure of the hot water due to variation in the speed of the circulating pump or impeller which may be employed.

In the accompanying drawing illustrating the preferred form of the invention, Fig. 1 is a section in elevation of a complete valve embodying the features of the invention; and Fig. 2 is a detail illustrating a modified form of valve disk which may be employed presenting a soft or yieldable surface to a hard seat.

In the illustrated embodiment of the invention, the valve is shown as provided with a drawn metal housing or body portion comprising essentially an upper portion 20 telescoping over an intermediate portion 22, which in turn is connected to a bottom portion 24. The upper portion receives and houses an actuator bellows 26 anchored at its upper end through a head 28 to which the bellows is soldered at 29. The head is reduced at 30 and passes through the upper end of the housing 20, being soldered or sealed thereto at 32. The upper end of the head 28 is threaded at 34 and provided with a cap nut 36 which mechanically locks the head to the housing. The head is provided with a bore 38 communicating with a hollow capillary 40 which may extend to any remote point.

As will be evident to those skilled in the art, the system, including the interior of the capillary and the interior of the bellows in free communication therewith, may be filled with any suitable thermostatic fluid for causing temperature changes in the region in which the capillary is located to be reflected in changes in pressure of the thermostatic fluid.

The lower or movable end of the bellows may be capped by a reentrant closure 42, as indicated in Fig. 1, which projects into proximity to the head at the fixed end and limits the contracting movement of the bellows. Secured and rigidly mounted upon the movable end of the bellows is a stem 44 which extends lengthwise of the valve structure and is connected at its opposite end to a compensating bellows 46. As indicated in the drawing, the lower connecting end of the stem is threaded into an internally threaded head 48 secured to the upper or movable end of the compensating bellows 46. This compensating bellows interconnected with the actuating bellows 26 causes pressure differences within the housing due to fluctuations in pressure of the controlled water or fluid to be balanced out, these variations in pressure, as will be obvious, acting equally upon the two bellows. To make this compensation possible the two bellows must be of the same mean diameter, and provided with approximately the same number of folds, in order that the surface presented to the otherwise unbalanced pressure shall be the same in each case. The compensating bellows 46 at its opposite or fixed end is provided with an attaching flange 50 which is connected and hermetically sealed to the lower portion of the housing 22.

The stem 44 has mounted thereon a liquid control valve cooperating with a fixed seat. As indicated particularly in Fig. 1, this seat is formed essentially by an inturned flange 62 upon the intermediate portion of the housing 22, this flange having attached thereto a seat ring 64 of brass, bronze or other suitable material, generally of rectangular cross-section, presenting an edge contact at 66 to the valve. The disk valve cooperating with the seat indicated at 68 as formed of brass, bronze or the like, is provided with a tapered seating surface 69 and is mounted upon the stem 44 in such a manner that it may freely tilt upon the stem and ake uniform contact throughout the periph / of the seat. This is accomplished by providing the stem with a generally spherical or ball-like protuberance 70 with a diaphragm 72 of Neoprene or similar rubber-like vulcanizable substance bonded at its outer periphery to the valve disk and at its inner periphery to the ball 70, the latter being then received on and secured to the stem, the diaphragm being supported below by the wall of the valve disk and above by a contact plate 74, mechanically locked in place by a snap ring 76.

It will be observed that with this construction leakage through the valve is effectually sealed, whereas the valve itself is free to tilt within a limited range with relation to the stem and cause full contact of the seating surfaces, which are composed of metal properly adapted for this purpose. As the rubber-like diaphragm in and of itself presents no considerable resistance to tilting, the seating of the disk with respect to the seat may be accomplished under the influence of relatively slight pressures. Furthermore, this tilting or swiveling of the valve with respect to the stem compensates for any slight misalignment of the stem with relation to the seat, whether due to the structure of the valve itself or to slight irregularities in movement of the two bellows to which the stem is connected at opposite ends. It is important to secure a properly balanced condition of the valve as a whole that the mean effective area of the upper and lower bellows which is the same should equal the effective port area of the valve.

The valve may be adjusted for different temperature regulation by adjustment of an opposing coiled spring 80 introduced between the head 48 and an adjustable adjustment 82. This abutment as indicated more particularly in Fig. 1, is in the form of a tubular member slidingly supported within an outer hexed tube 84 and internally threaded at 86 to receive a threaded adjusting stem 88. This stem projects through the lower end of the housing and may be provided with a knurled nut at 90, through which it is rotated, rotation of the stem due to the fact that the tubular seat is held against rotation causing a rising and falling of the seat with a change in position of the length of the spring.

In the modification shown in Fig. 2, the valve disk and seat are somewhat modified to present the combination of a hard seat with a soft or yielding valve surface. In this type of structure a seating ring 100 is provided with a curved seating rib 102 designed to be engaged by the surface of a vulcanized rubber-like material such as a sheet of Neoprene indicated at 104. This vulcanizable sheet is bonded with the ball-like protuberance 70 at its inner margin, and is engaged between an upper disk 106 and a lower and smaller disk 108 provided with a depending flange or petticoat 110. With this structure, as will be evident, engagement is between the surface of the Neoprene and the rib 102, the disk being permitted to tip by yielding of the Neoprene diaphragm with respect to the ball 70. It will be noted, furthermore, that in both types of valve due to the petticoat 110 as shown in Fig. 2 and to the tapered surface 112 on the valve shown in Fig. 1, movement of the valve toward and from its seat serves to control the flow of fluid therethrough in a manner to modulate the flow rather than to present either an open or closed position.

What is claimed is:

In a valve of the type employing a valve disk having a valve stem extending therethrough and operatively engaging devices on either side of the valve disk, a tiltable fluid-tight connection between the disk and stem comprising a ball sealed to the valve stem and seated in the valve disk to impart positive bodily movement thereto upon lengthwise movement of the stem while permitting relative tilting movement, and an annulus of resilient material bonded along its inner margin to the ball and adapted adjacent its outer margin to engage the valve seat to provide a resilient seating surface.

WALTER B. CLIFFORD.